United States Patent [19]

Baccini et al.

[11] 3,855,286

[45] Dec. 17, 1974

[54] N-CARBOXYMETHYL-N-(2-HYDROXYBENZYL) ASPARTIC ACID AND DERIVATIVES THEREOF

[75] Inventors: Peter Baccini, Kriens; Werner Fory, Basel, both of Switzerland

[73] Assignee: Ciba-Geigy Corporation, Ardsley, N.Y.

[22] Filed: Sept. 27, 1972

[21] Appl. No.: 292,708

[30] Foreign Application Priority Data

Oct. 1, 1971  Switzerland.................. 14347/71

[52] U.S. Cl................ 260/519, 71/97, 260/429.9, 260/438.1, 260/439 R, 260/507 R, 260/516, 260/534 E

[51] Int. Cl........................................... C07c 101/72

[58] Field of Search...................... 260/519, 507 R

[56] References Cited
UNITED STATES PATENTS 2,200,220  5/1940  Reppe et al...................... 260/519
2,717,263  9/1955  McKinney et al. ............... 260/519
2,840,603  6/1958  Mock et al......................... 260/519
2,967,196  1/1961  Kroll et al......................... 260/519
3,394,174  7/1968  Feigin................................ 260/519

*Primary Examiner*—James A. Patten
*Assistant Examiner*—Patrick J. Hagan
*Attorney, Agent, or Firm*—Harry Falber; Frederick H. Rabin

[57] ABSTRACT

N-carboxymethyl-N-(2-hydroxybenzyl)-asparagic acids which may be further substituted in the phenyl nucleus possess metal-chelating properties for metals such as iron magnesium, calcium, manganese, cobalt, nickel, copper, zinc, calcium or related metals. Chelates of this type may be used for the regulation of metal-deficiency phenomena in plants.

6 Claims, No Drawings

N-CARBOXYMETHYL-N-(2-HYDROXYBENZYL) ASPARTIC ACID AND DERIVATIVES THEREOF

The present invention relates to new chelating agents and their metal complexes, also to agents and processes for the regulation of metal-deficiency phenomena in plants by application of the new chelates or of agents containing them.

The new chelating agents are to be understood as being asparagic acid derivatives, and correspond to the formula:

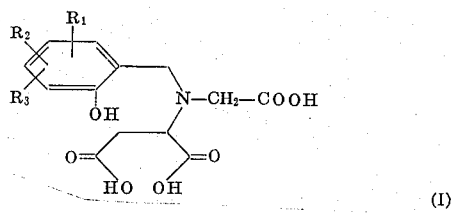

(I)

wherein
$R_1$ represents hydrogen, hydroxy, halogen, sulpho, carboxyl, alkyl, alkoxy, alkylthio, halogenoalkyl, dialkylamino, acyl or phenyl,
$R_2$ represents hydrogen, hydroxy, halogen, alkyl or alkoxy, and
$R_3$ represents hydrogen or alkyl.

Alkyl radical $R_1$, $R_2$ and $R_3$ in formula I are radicals having 1 to 6 carbon atoms in a straight or branched chain such as the methyl, ethyl, n-propyl or isopropyl radical, as well as the n-butyl, n-pentyl and n-hexyl radicals and their isomers. These radicals form also the alkyl moiety of alkoxy, alkylthio, halogenoalkyl and dialkylamino radicals. To be mentioned as acyl radicals are, in particular, alkanoyl radicals, such as the acetyl or propionyl radical. Halogen denotes preferably chlorine or bromine.

The chelating agents according to the invention are obtained by the reaction of maleic acid and glycine to give N-carboxymethyl-asparagic acid of formula II

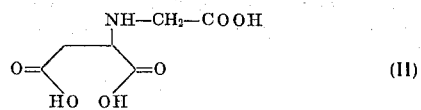

(II)

and the subjecting of this, in a manner known per se, to the Mannich reaction with formaldehyde and a phenol of formula III

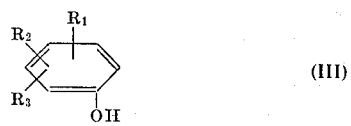

(III)

wherein $R_1$, $R_2$ and $R_3$ have the meanings defined under formula I.

The reactions are preferably performed in aqueous solution. For the production of N-carboxymethyl-asparagic acid, it is advisable to add an alkali metal hydroxide such as sodium or potassium hydroxide. As is known, aqueous solutions are employed for the Mannich reaction, including weakly alkaline aqueous solutions and mixtures of water with organic solvents such as alkanols, dioxane, benzene, toluene or glacial acetic acid. It is also possible to use one of the reactants in excess as solvent, provided that the procedure does not affect the course of the reaction. The formaldehyde is preferably used in aqueous solution, or in the form of paraldehyde.

With the use of glacial acetic acid as solvent for the Mannich reaction, an alkali metal acetate is preferably added. The chelating agents according to the invention are obtained principally as monoalkali metal salts, and can be employed direct for the production of the metal complexes. Cationic exchange and subsequent crystallisation are applied to obtain, if desired, the free o-hydroxy-benzyl-asparagic acids.

The monoalkali metal salts of the new chelating agents can be optionally converted, by ion exchange, into ammonium salts; the corresponding di- or trialkali metal salts and di- or triammonium salts are obtained by reaction with alkali metal hydroxides and with ammonia, respectively.

The compounds according to the invention form metal complexes with iron, magnesium, calcium, manganese, cobalt, nickel, copper, zinc, cadmium, or related metals. For this purpose, the chelating agents are reacted, in the presence of water, or a mixture of water with alkanols such as methanol or ethanol, or with tetrahydrofuran, either with a metal hydroxide, preferably in an inert gas, or with a metal salt with the addition of alkali metal hydroxides. The reaction temperatures are between 0° and 100°C.

The new chelating agents of formula I can moreover be obtained by:

a. use of bromosuccinic acid instead of maleic acid, and carrying out of the further reactions in the described manner;

b. condensation of asparagic acid with formaldehyde and a phenol according to the Mannich reaction, and reaction of the intermediate with chloroacetic acid;

c. reaction of the intermediate of formula II with an o-hydroxy-benzyl-halide;

d. reaction of o-hydroxybenzylamine either with maleic acid and then with chloroacetic acid, or with chloroacetic acid firstly and then with bromosuccinic acid.

In the case of reactions with chloroacetic acid, phenolic hydroxyl groups should be protected; for example, by conversion into the corresponding carbonic acid esters. For the reaction too according to (c), the o-hydroxylbenzyl halide can be used in the form of a carbonic acid ester.

The process according to the invention for the production of the new compounds of formula I is illustrated by the following examples. The temperatures are given in degrees Centigrade. New compounds of formula I which can be produced by the described processes are listed in the attached table.

Production of asparagic acid derivatives a. An amount of 196 g of maleic acid anhydride is stirred in 200 ml of water at room temperature for one hour. Additions are then made, at a temperature of 75° – 80°, of 172 g of 50% sodium hydroxide solution, and subsequently of 150 g of glycine in 120 ml of water and 160 g of 50% sodium hydroxide solution. The solution is refluxed for 48 hours, and afterwards allowed to cool to room temperature. The pH-value is adjusted to 1 by the addition of hydrochloric acid, and the formed precipitate filtered off. The filtrate is concentrated by evaporation to obtain a semifluid consistency; the crude product is then filtered off, washed with acetone and dried. The obtained N-carboxymethyl-asparagic acid still contains 50 – 55% of sodium chloride, and is used without further purification for the following stage of synthesis.

The pure hydrochloride of N-carboxymethyl-asparagic acid, which melts at 170°C with decomposition, can be obtained by reaction with glacial acetic acid and concentrated hydrochloric acid.

b. An amount of 122 g of 47% N-carboxymethyl-asparagic acid is suspended in 150 ml of glacial acetic acid and 40.8 g of sodium acetate, and an addition then made of 26.5 g of 36% formalin solution and 48.7 g of 4-methyl-phenol. The reaction mixture is stirred for 20 hours at 60°, and then cooled to room temperature. The sodium chloride is separated by filtration, and washed with 100 ml of glacial acetic acid. An addition is made to the filtrate of 1,450 ml of acetone. The colourless precipitate is isolated, washed with 100 ml of glacial acetic acid/acetone 1:5, then repeatedly with acetone, and dried at 70°/12 Torr for 24 hours. The obtained monosodium salt of N-(2-hydroxy-5-methyl-benzyl)-N-carboxymethyl-asparagic acid still contains 0.3 equivalent of sodium acetate and one equivalent of water; it melts from 150° with decomposition.

c. An amount of 9.5 g (0.05 mole) of N-carboxymethylasparagic acid is dissolved in a mixture of 40 ml of water and 37.5 ml of 2N NaOH (0.075 mole), and the solution heated to 60°C. Additions are then successively made of 8.2 g of a 36.6% aqueous solution of formaldehyde (0.0625 mole) and 7.65 g (0.0625 mole) of 2,4-dimethyl-phenol, and stirring maintained for 40 hours at 60°C. The reaction mixture is cooled, and extracted 2 – 3 times with a mixture of ether/toluene (1:1). The content of N-(2-hydroxy-3,5-di-methyl-benzyl)-N-carboxymethylasparagic acid in the aqueous solution is colorimetrically determined as iron complex and amounts to 66%.

Production of iron(III)-complexes a. An amount of 16.2 g of anhydrous iron(III)chloride and one of 150 ml of 2N sodium hydroxide solution are heated to 90°. The iron(III)hydroxide suspension, cooled to room temperature, is centrifuged, the solid part separated, and repeatedly washed with water. The iron(III)hydroxide isolated in this manner is suspended in 400 ml of water; 36 g of monosodium salt of N-(2-hydroxy-5-methyl-benzyl)-N-carboxymethyl-asparagic acid is added to the suspension, and the whole stirred for 4 hours at 90°–95° in a nitrogen atmosphere. A violet solution is formed. After the solvent has been distilled off, there remains the monosodium salt of N-(2-hydroxy-5-methyl-benzyl)-N-carboxymethyl-asparagic acid-iron(III)-complex, which melts from 260° with decomposition.

b. An amount of 36 g of monosodium salt of N-(2-hydroxy-5-methyl-benzyl)-N-carboxymethyl-asparagic acid is suspended in 200 ml of ethanol, and an addition then made, with stirring, of 16.2 g of iron(III)chloride (anhydrous) in 100 ml of ethanol. There is subsequently made an addition of 12 g of sodium hydroxide in 70 ml of ethanol, and the reaction mixture stirred for a further 2 hours. The solvent is distilled off to obtain the monosodium salt of N-(2-hydroxy-5-methyl-benzyl)-N-carboxymethyl-asparagic acid-iron(III)-complex. The product still contains 5 – 6% of water and 24 – 25% of sodium chloride, and yields the following analysis values:

| | | | | | |
|---|---|---|---|---|---|
| Calculated: | C | 28.7 | N | 2.0 | Fe 8.4% |
| Found: | C | 28.5 | N | 2.0 | Fe 8.1% | c. An amount of 3.2 g (0.01 mole) of N-(2-hydroxy-3,5-dimethyl-benzyl)-N-carboxymethyl-asparagic acid is suspended in 50 ml of $H_2O$, and an addition made of 0.4 g of NaOH (0.01 mole) and 0.61 g of Fe-powder (0.011 mole).

The mixture is heated to 40° and, at this temperature, a vigorous flow of air passed through the mixture for 15 – 20 hours. The pH-value is maintained at 3.5 during the entire reaction (addition of hydrochloric acid, if necessary). The end of the reaction is determined by spectrometrical control measurement.

The solution is filtered, and concentrated by evaporation to dryness. The monosodium salt of N-(2-hydroxy-3,5-dimethylbenzyl)-N-carboxymethyl-asparagic acid-iron(III)-complex is thus obtained.

Production of the calcium complex

An amount of 21.7 g of the monosodium salt of N-(2-hydroxy-3,5-dimethyl-benzyl)-N-carboxymethyl-asparagic acid (80%) is dissolved in 100 ml of water; 5.55 of calcium chloride in 30 ml of water is then added at room temperature, and subsequently 6 g of sodium salt in 30 ml of water; the reaction mixture is then concentrated by evaporation to dryness to obtain the disodium salt of N-(2-hydroxy-3,5-dimethyl-benzyl)-N-carboxymethyl-asparagic acid-calcium complex; the decomposition point is ca. 260°.

Ca-content: calculated: 6.0%, found: 6.2%

The metal complexes of N-(2-hydroxy-3,5-dimethylbenzyl)-N-carboxymethyl-asparagic acid given in the following table are obtained by the process described above.

| Metal ion | λ max (nm) | pH |
|---|---|---|
| $Mn^{++}$ | 283.340 (S) | 7 |
| $Zn^{++}$ | 285 | 7.02 |
| $Cu^{++}$ | 430.745 | 7.02 |
| $Fe^{+++}$ | 503 | 7.0 |
| $Co^{++}$ | 480.500 (S) | 7.01 |
| S = shoulder | | |

The following alkali metal salts and ammonium salts of compounds of formula I are obtained by process previously described:

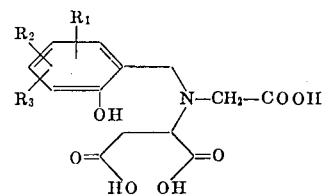

(1)

| Compound No. | R₁ | R₂ | R₃ | Type of salt | Decomposition point |
|---|---|---|---|---|---|
| 1 | H | H | H | Na | 93° |
| 2 | 5—CH₃ | H | H | Na | 150° |
| 3 | 5—Cl | H | H | Na | 160° |
| 4 | 5—OCH₃ | H | H | Na | 150° |
| 5 | 3—CH₃ | 5—CH₃ | H | Na | 160° |
| 6 | 5—OH | H | H | Na | 170° |
| 7 | 5—t—C₅H₁₁ | H | H | Na | 170° |
| 8 | 5—C₂H₅ | H | H | Na | 115° |
| 9 | 5—C₆H₅ | H | H | Na | 175° |
| 10 | 5—t—C₄H₉ | H | H | Na | 160° |
| 11 | 4—CH₃ | H | H | Na | 150° |
| 12 | 5—t—C₄H₉ | 3—CH₃ | H | Na | 160° |
| 13 | 5—SCH₃ | H | H | Na | |
| 14 | 5—Br | H | H | Na | 170° |
| 15 | 3—CH₃ | H | H | Na | |
| 16 | 3—COOH | H | H | Na | |
| 17 | 5—SO₃Na | H | H | Na | 77–85° |
| 18 | 5—COCH₃ | H | H | Na | 125° |
| 19 | 4—N(CH₃)₂ | H | H | Na | |
| 20 | 4—CF₃ | H | H | Na | 130° |
| 21 | 4—OH | 6—OH | H | Na | |
| 22 | 3—OH | 4—OH | H | Na | 95° |
| 23 | 4—OCH₃ | H | Na | | |
| 24 | 3—OCH₃ | 4—OCH₃ | H | Na | 147° |
| 25 | 3—Cl | 5—Cl | H | Na | 130° |
| 26 | 3—CH₃ | 4—CH₃ | 6—CH₃ | Na | |

Chelating agents are already known and have been employed in many commercial fields of application. The chelating agent with the widest sphere of application is ethylenediaminetetraacetic acid. It is already known that metal complexes of ethylenediaminetetraacetic acid, as well as of other chelating agents, are used for the correction of metal-deficiency phenomena, which occur, for example, in plants. Thus, the iron chelate of ethylenediaminetetraacetic acid is used for the treatment of asiderosis, which occurs in the case of citrus plants growing in acid soil. It is known, however, that this chelate is unstable in neutral or slightly alkaline solution, the resulting decomposition producing the iron(III)hydroxide and a soluble salt of ethylenediaminetetraacetic acid. Consequently, this chelate cannot be employed with any great measure of success for the correction of metal-deficiency phenomena occurring in plants growing in alkaline soil.

There has been the suggestion made recently that the iron chelates of hydroxyethylenediamine triacetic acid, and of certain ethylene-bis-(α-imino-o-hydroxyphenylacetic acids), likewise be used for plant nutrition. These chelates are somewhat more effective than the chelates of ethylenediaminetetraacetic acid; however, they do not possess the desired stability over a wide pH-range. (Brit. P. 832,989).

The new asparagic acid derivatives of formula I are excellent complex-forming agents. The chelates formed with the most diverse metals are stable over a wide pH-range. They are thus suitable for the correction of metal-deficiency phenomena occurring in plants growing both in acid and in alkaline soils.

A particular advantage of the new chelates is their effectiveness after application to parts of plants above the soil. Chelates known hitherto have an unsatisfactory action when applied in this manner; they have to be worked into the growth substrate. The new chelates are therefore especially valuable for application in the cultivation of vines, of stone and pomaceous fruit, or of cultivated plants.

By virtue of the excellent properties of their chelates, asparagic acid derivatives of formula I a are preferred:

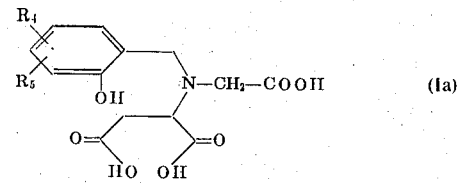

(Ia)

The symbols in this formula have the following meanings:

$R_4$ represents hydrogen, hydroxy, halogen, sulpho, carboxyl, alkyl, alkoxy, alkylthio or phenyl, and $R_5$ represents hydrogen, halogen, alkyl or alkoxy.

Alkyl radicals $R_4$ and $R_5$ contain 1 to 6 carbon atoms in a straight or branched chain; they are, for example, those given on page 2. Those having 1 to 4 carbon atoms form the alkyl moiety of alkoxy or alkylthio radicals. Halogen represents chlorine or bromine.

The following tests show the action of iron complexes of asparagic acid derivatives against chlorosis:

1. Tomato plants with clear chlorosis symtoms are placed into a nutrient solution containing the iron chelate in concentrations of respectively 1 and 0.3 mg of iron per litre. The pH-value is stabilised at 7.5 – 8 by a buffer solution. The test is evaluated after 14 days. Evaluation:

1 = 0% effectiveness = leaves completely yellow,
4 = 100% effectiveness = leaves dark green,
2+3 = ca. 30 – 65% effectiveness, i.e. leaves yellowish green to light green.

| Iron complex of compound No. | Concentration Fe⁺⁺⁺/litre | |
|---|---|---|
| | 1 mg | 0.3 mg |
| 1 | 4 | 4 |
| 3 | 4 | 4 |
| 4 | 4 | 4 |
| 5 | 4 | 3 |
| 6 | 4 | 3 |
| 7 | 4 | 4 |
| 8 | 4 | 4 |
| 12 | 4 | 4 |
| 14 | 4 | 3 |
| 24 | 4 | 4 |

2. Soya bean plants are germinated in quartz sand, and then planted in special alkaline soil (pH 7.8 in water). When the uppermost leaves display severe chlorosis symtoms the iron chelates are mixed in solid form with the topmost layer of soil, and distributed by watering. The concentrations are 1, 0.3 and 0.1 mg of iron per pot of three plants. An assessment is made after 14 days of the colouration of the leaves, applying the scale of values defined in the 1st test. The commercial product, Na/Fe-diethylenetriaminepentaacetic acid (= Sequestren 330 Fe) taken as a comparison produced, compared with the iron chelates of the present invention, only a slight change of colour of the leaves from yellow to green.

| Iron complex of | Concentration Fe$^{+++}$/pot | | |
| Compound No. | 1 mg | 0,3 mg | 0,1 mg |
| --- | --- | --- | --- |
| 1 | 3,8 | 3,5 | 1,5 |
| 2 | 3,8 | 2,5 | 1,3 |
| 3 | 3,3 | 2 | 1 |
| 4 | 3,5 | 1,5 | 1,3 |
| 5 | 4 | 3,3 | 2,3 |
| 7 | 4 | 3,5 | 1,7 |
| 8 | 4 | 3,3 | 1,5 |
| 11 | 3,2 | 2,7 | 1,3 |
| 12 | 3,8 | 3,5 | 2,5 |
| 14 | 4 | 3,2 | 2 |
| 24 | 4 | 3,2 | 1,8 |
| Sequestren 330 Fe | 2 | 1 | 1 |

3. Cucumber plants are germinated in quartz sand, and then placed into an iron-free nutrient solution until the leaves are yellow (chlorotic). The iron chelate in a concentration of 300 mg of iron per litre is subsequently sprayed on to the plants, these being afterwards left standing in the Fe$^{+++}$-free nutrient solution. An assessment of leaf colouration is made 14 days after application, the basis for evaluation being the scale of values used in the first test.

| Iron complex of Compound No. | Concentration Fe/litre 300 mg |
| --- | --- |
| 1 | 2.5 |
| 6 | 2.7 |
| 14 | 2.8 |
| Sequestren 330 Fe | 2 |

There are moreover other uses for the new asparagic acid derivatives of formula I; for example, in the metal-working industry, where they can be used for the prevention of rust and of other oxide films. They can also be used in the detergent and bleach industry; e.g., for the removal of undesirable metal traces.

Agents according to the invention are produced in a manner known per se by the intimate mixing and grinding of metal complexes of compounds of the general formula I, referred to in the following as "active substance," with suitable carriers, optionally with the addition of dispersing agents or solvents which are inert to the active substances. The active substances can be obtained and applied in the following forms:
solid preparations: dusts, scattering agents, granulates, (coated granulates, impregnated granulates and homogeneous granulates);
water-dispersible concentrates of the active substance: wettable powders;
liquid preparations: solutions.

The solid preparations (dusts, scattering agents, granulates) are produced by the mixing of the active substances with solid carriers. Suitable carriers are, e.g. kaolin, talcum, bole, loess, chalk, limestone, ground limestone, Attaclay, dolomite, diatomaceous earth, precipitated silicic acid, alkaline-earth silicates, sodium and potassium aluminum silicates (feldspars and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

The concentrations of active substance in the solid preparation forms are from 0.5 to 80%.

To these mixtures may also be added additives stabilising the active substance, and/or non-ionic, anion-active, and cation-active substances, which, for example, improve the adhesiveness of the active substances on plants and on parts of plants (adhesives and agglutinants), and/or ensure a better wettability (wetting agents) and dispersibility (dispersing agents). Suitable adhesives are, for example, the following: olein/lime mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, its alkali metal and alkaline-earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide, propylene oxide, polyvinyl pyrrolidones, polyvinyl alcohols, condensation products of urea and formaldehyde, as well as latex products.

Water-dispersible concentrates of active substance, i.e. wettable powders, are agents which can be diluted with water to obtain any desired concentration. They consist of active substance, carrier, optionally additives which stabilise the active substance, surface-active substances, and anti-foam agents and, optionally, solvents. The concentration of active substance in these agents is 5 to 80%.

The wettable powders are obtained by the mixing and grinding of the active substances with dispersing agents and pulverulent carriers, in suitable devices, until homogeneity is attained. Suitable carriers are, e.g. those previously mentioned in the case of solid preparations. It is advantageous in some cases to use mixtures of different carriers. As dispersing agents it is possible to use, e.g. condensation products of sulphonated naphthalene and sulphonated naphthalene derivatives with formaldehyde, condensation products of naphthalene or of naphthalenesulphonic acids with phenol and formaldehyde, as well as alkali, ammonium and alkaline-earth metal salts of ligninsulphonic acid, also alkylaryl sulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, for example, silicones.

The active substances are so mixed, ground, sieved and strained with the above mentioned additives that the solid constituent in the case of wettable powders has a particle size not exceeding 0.02 to 0.04 mm.

Furthermore, the agents according to the invention can be used in the form of solutions. For this purpose the active substance (or several active substances) is (or are) dissolved in suitable organic solvents, mixtures of solvents, water, or mixtures of organic solvents with water. As organic solvents it is possible to use polar organic solvents such as, e.g. alkanols. The solutions should contain the active substances in a concentration of from 1 to 20%. These solutions can be applied with the aid of sprays.

Other biocidal active substances or agents may be added to the described agents according to the invention. For the widening of their sphere of action, the new agents may also contain, in addition to the stated compounds, for example, insecticides, fungicides, bactericides, fungistatics, bacteriostatics or nematocides. The agents according to the invention can also contain fertilisers and additional micronutrients, etc., Preparations of the new active substances are described in the following. The term 'parts' denotes parts by weight.

Wettable powder

The following constituents are used for the preparation (a) of a 70% (b) of a 25%, and (c) of a 10% wettable powder:

a)
- 70 parts of the monopotassium salt of the iron (III)-complex of Compound No. 5,
- 5 parts of sodium dibutylnaphthyl sulphonate,
- 3 parts of naphthalenesulphonic acid/phenolsulphonic acid/formaldehyde condensate 3:2:1,
- 10 parts of kaolin,
- 12 parts of Champagne chalk;

b)
- 25 parts of the monosodium salt of the iron(III)-complex of Compound No. 24,
- 5 parts of the sodium salt of oleyl methyl tauride,
- 2.5 parts of naphthalenesulphonic acid/formaldehyde condensate,
- 0.5 part of carboxymethylcellulose,
- 5 parts of neutral potassium aluminium silicate,
- 62 parts of kaolin;

c)
- 10 parts of the monosodium salt of the iron(III)-complex of Compound No. 5,
- 3 parts of a mixture of sodium salts of saturated fatty alcohol sulphates,
- 5 parts of naphthalenesulphonic acid/formaldehyde condensate,
- 82 parts of kaolin.

The given active substance is mixed and subsequently ground with the carriers (kaolin and chalk). Wettable powders are obtained from which can be prepared, by dilution with water, stable suspensions of any desired concentration of active substance.

Paste

The following substances are used for the preparation of a 45% paste:

45 parts of the monosodium salt of the iron(III)-complex of Compound No. 5,
5 parts of sodium aluminium silicate,
14 parts of cetyl polyglycol ether having 8 moles of ethylene oxide,
1 part of oleyl polyglycol ether having 5 moles of ethylene oxide,
2 parts of spindle oil,
10 parts of polyethylene glycol,
23 parts of water.

The active substance is intimately mixed and ground, in suitable devices, with the additives. A paste is obtained from which can be prepared, e.g. by dilution with the 22-fold amount of water, a 2% suspension.

We claim:

1. Asparagic acid derivatives of formula I and their alkali metal and ammonium salts

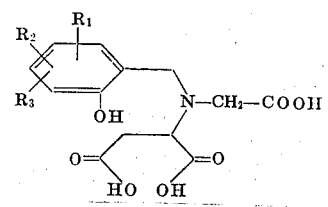

(I)

wherein
$R_1$ represents hydrogen, hydroxy, halogen, sulpho, carboxyl, $C_1-C_6$ alkyl, $C_1-C_6$ alkoxy, $C_1-C_6$ halogenoalkyl, di-($C_1-C_6$ alkyl)amino, $C_2-C_4$ alkanoyl or phenyl,
$R_2$ represents hydrogen, hydroxy, halogen, $C_1-C_6$ alkyl or $C_1-C_6$ alkoxy, and
$R_3$ represents hydrogen or $C_1-C_6$ alkyl.

2. Asparagic acid derivatives of formula Ia and their alkali metal and ammonium salts according to claim 1

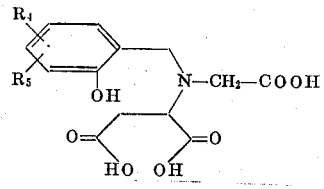

(Ia)

wherein
$R_4$ represents hydrogen, hydroxy, halogen, sulpho, carboxyl, $C_1-C_6$ alkyl, $C_1-C_4$ alkoxy, or phenyl, and
$R_5$ represents hydrogen, halogen, $C_1-C_6$ alkyl or $C_1-C_4$ alkoxy.

3. The compound of the formula

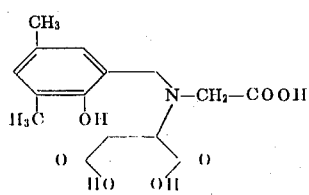

and its alkali metal and ammonium salts according to claim 1.
4. The compound of the formula
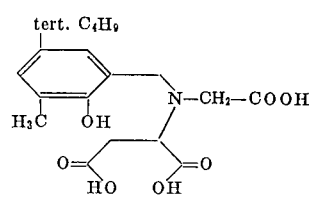
and its alkali metal and ammonium salts according to claim 1.
5. The compound of the formula
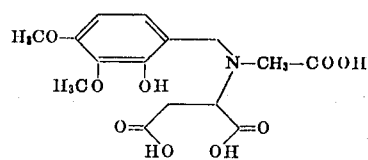
and its alkali metal and ammonium salts according to claim 1.
6. Alkali metal salts of the compounds of claim 1.
* * * * *